US006574954B2

United States Patent
Wakui et al.

(10) Patent No.: US 6,574,954 B2
(45) Date of Patent: Jun. 10, 2003

(54) ELECTRONIC CONTROL UNIT FOR CONTROLLING IGNITION TIMING DURING REDUCTION OF NOX OCCLUDED BY LEAN NOX CATALYST

(75) Inventors: Masayuki Wakui, Wako (JP); Junichi Suzuki, Wako (JP); Masayuki Ueno, Wako (JP); Osamu Kitamura, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/963,795

(22) Filed: Sep. 27, 2001

(65) Prior Publication Data

US 2002/0046563 A1 Apr. 25, 2002

(30) Foreign Application Priority Data

Oct. 25, 2000 (JP) ........................................ 2000-325163

(51) Int. Cl.$^7$ ................................................ F01N 3/00
(52) U.S. Cl. ........................................ 60/285; 60/274
(58) Field of Search .................... 60/274, 276, 285, 60/286; 123/406.23, 406.45, 406.44, 406.47

(56) References Cited

U.S. PATENT DOCUMENTS

| 5,448,975 A | * | 9/1995 | Sato ........................ 123/406.44 |
| 5,535,586 A | * | 7/1996 | Ohta et al. ..................... 60/285 |
| 5,595,060 A | * | 1/1997 | Togai et al. .................... 60/274 |
| 5,638,790 A | * | 6/1997 | Minowa et al. .......... 123/406.23 |
| 5,640,939 A | * | 6/1997 | Shimada et al. ........ 123/406.47 |
| 5,845,492 A | * | 12/1998 | Isobe et al. ..................... 60/285 |
| 5,867,983 A | * | 2/1999 | Otani ........................... 60/285 |
| 6,161,523 A | * | 12/2000 | Unland et al. ......... 123/406.23 |

FOREIGN PATENT DOCUMENTS

JP          7-103015         4/1995

* cited by examiner

Primary Examiner—Thomas Denion
Assistant Examiner—Tu M. Nguyen
(74) Attorney, Agent, or Firm—Arent Fox Kintner Plotkin & Kahn

(57) ABSTRACT

The invention provides an electronic control unit for controlling an air/fuel ratio of an engine having a lean NOx catalyst in its exhaust system in order to prevent the decrease of the fuel efficiency without deterioration of the drivability due to a rich operation for reducing the NOx catalyst. The electronic control unit includes: an air/fuel ratio control system for changing the air/fuel ratio to a rich side when the amount of NOx occluded by the lean NOx catalyst exceeds a predetermined value and changing said air/fuel ratio back to a lean side when a first predetermined period has elapsed; a lagging system for lagging ignition timing in synchronization with the air/fuel ratio changing to the rich side by said air/fuel ratio control system; and decrementing system for decreasing the amount of the ignition timing lagged by the lagging system by a predetermined amount when a second predetermined period shorter than said first predetermined period has elapsed after the air/fuel ratio changing to the rich side. According to the invention, it is possible to prevent the decrease of the fuel efficiency without the deterioration of the drivability due to the rich operation to reduce the NOx catalyst because the ignition timing is lagged in synchronization with the air/fuel ratio changing to the rich side and the lagged amount is decremented after a predetermined period has elapsed. In one embodiment, the decrementing system gradually decrements said lagging amount up to a hold value.

2 Claims, 10 Drawing Sheets

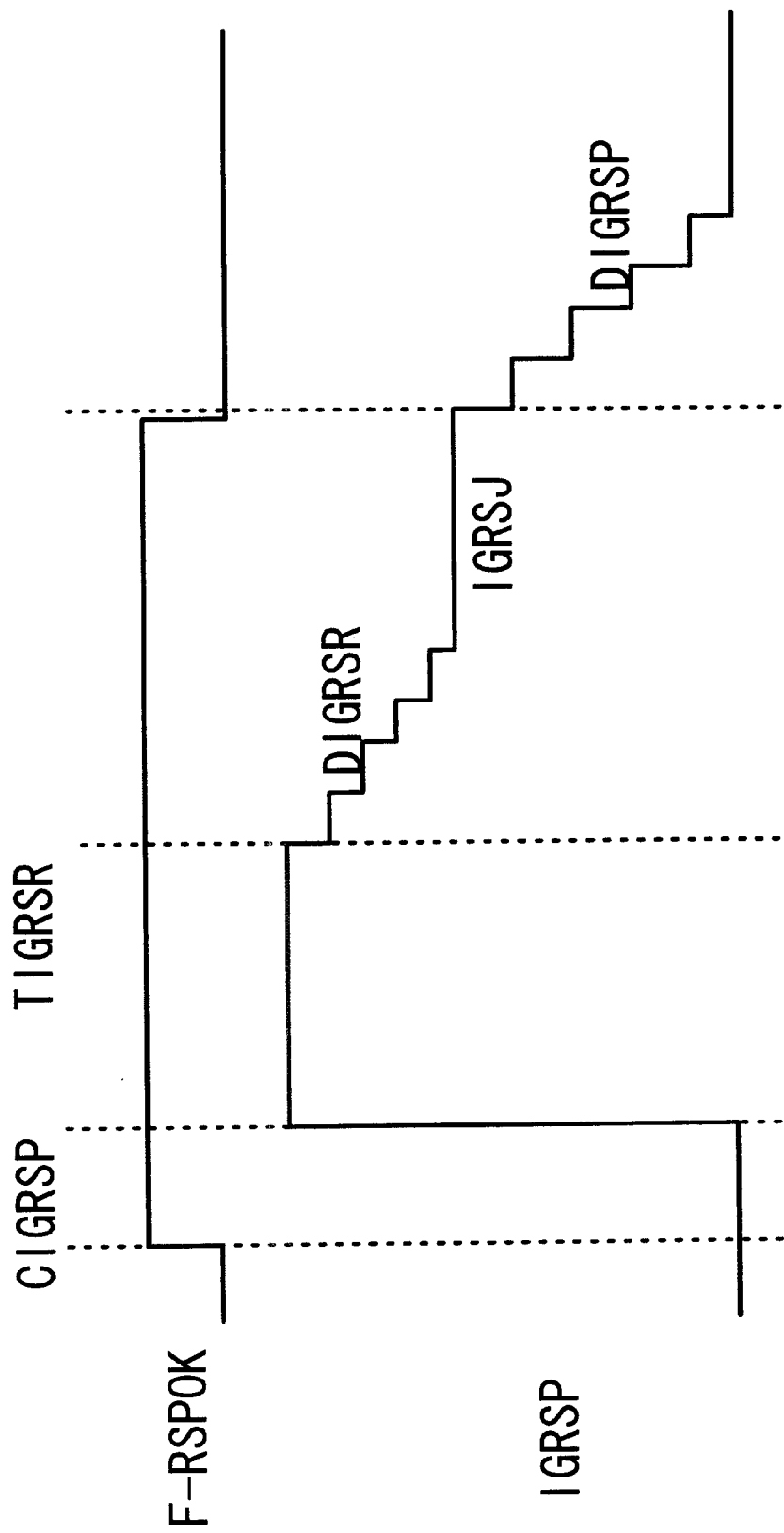

ELECTRONIC CONTROL UNIT FOR CONTROLLING IGNITION TIMING DURING REDUCTION OF NOX OCCLUDED BY LEAN NOX CATALYST

TECHNICAL FIELD

The invention relates to controlling the ignition timing of engines used for automobiles, and more specifically to controlling the ignition timing of engines in automobiles provided with lean NOx catalyst.

BACKGROUND OF THE INVENTION

As is well known, an air/fuel (A/F) ratio in a lean-burn engine having lean NOx catalyst (LNC) is periodically changed to rich side to reduce the NOx occluded by LNC during the lean-burn operation. Another technique is also known for performing ignition timing retard (lagging) while the air/fuel ratio is being kept rich in order to absorb the engine torque that may occur due to rich operation, suppressing the deterioration of drivability (that is, shock) due to possible torque fluctuation.

For example, The Japanese Laid-Open Patent Application No. 7-103015 discloses a method for controlling the amount of intake air during rich reduction process (shift-to-rich process) as well as lagging the ignition timing, to improve the drivability during the rich reduction process.

In those conventional techniques, however, a rich reduction period required for reducing the lean NOx catalyst saturated with NOx may become too long when, for example, the automobile runs at low-speed. If the ignition timing is keep retarded throughout such long rich reduction period, the combustion efficiency may be decreased and consequently the fuel efficiency may become worse.

SUMMARY OF THE INEVNTION

In order to resolve the aforementioned problem, according to one aspect of the invention, an electronic control unit is provided, comprising: air/fuel ratio control means for changing the air/fuel ratio to a rich side when the amount of the NOx occluded by the lean NOx catalyst exceeds a predetermined value and changing said air/fuel ratio back to a lean side when a first predetermined period has elapsed; lagging means for lagging the ignition timing in synchronization with the air/fuel ratio change to the rich side by said air/fuel ratio control means; and decrementing means for decrementing by a predetermined amount the lagged amount of the ignition timing by said lagging means when a second predetermined period shorter than said first predetermined period has elapsed after the air/fuel ratio change to the rich side.

The ignition timing is lagged in synchronization with the air/fuel ratio changing to the rich side and the lagged amount of the ignition timing is decremented after the predetermined period has elapsed. Therefore, it is possible to prevent the decrease of the fuel efficiency without deterioration of the drivability due to the rich operation for reducing the NOx catalyst. In one preferred embodiment of the invention, said first predetermined period is a period that elapses before an accumulated value SRSNT1 of intake air amount correlation value reaches a threshold value, and said second predetermined period corresponds to a value TIGRSR, which will be discussed later.

According to another aspect of the invention, said decrementing means of the electronic control unit gradually decrements said lagged timing amount up to a hold value. Because the lagged timing amount decrements gradually up to the hold value, it is possible to prevent the decrease of the fuel efficiency without the deterioration of the drivability.

BRIEF DESCRIPTION OF THE DRAWINGS

FIG. 8 is a graphical chart illustrating a relationship between a retard amount IGRSP and timing of the rich reduction process;

DETAILED DESCRIPTION OF THE PREFERRED EMBODIMENTS

Figure 1:
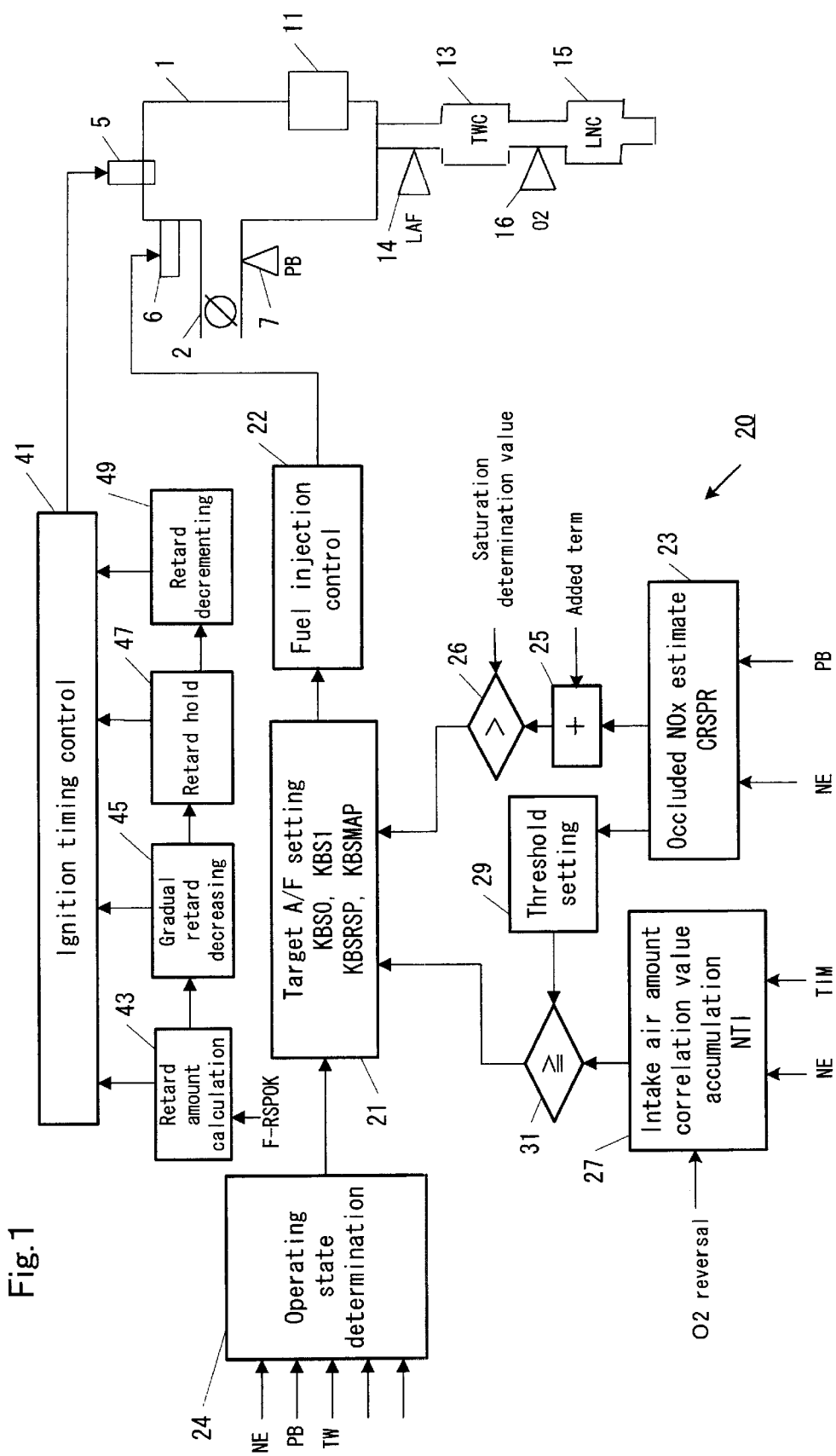
FIG. 1 is a block diagram illustrating the configuration of en engine, an exhaust gas cleaning unit and an electronic control unit in accordance with one embodiment of the invention.

A preferred embodiment of the invention will be described in the following with reference to the accompanying drawings. FIG. 1 illustrates the structure of an engine to which the invention is applied. As illustrated in FIG. 1, an engine 1 comprises an air intake pipe 2, an ignition plug 5, a fuel injector 6, sensors 11, and an exhaust system. With the intake pipe 2 is provided a pressure sensor 7 for detecting pressure within the intake pipe (PB), which is converted to the electric signal by the pressure sensor 7 to be supplied to an electronic control unit (ECU) 20.

The sensors 11 include an engine revolution (NE) sensor, which generates a signal pulse (TDC pulse) at a predetermined crank angle position of the crankshafts of the engine 1 and sent the signal to ECU 20. The sensors 11 generally represent a plural of sensors including some other sensors such as the engine water temperature sensor.

There is provided a three-way catalyst (TWC) 13 for cleaning HC, CO and NOx in the exhaust system. Downstream of the TWC 13, a lean NOx catalyst (LNC) 15 is provided in series for occluding the NOx. LNC occludes the NOx generated during lean operation and then the occluded NOx will be reduced by HC and CO, contained in exhaust gas, to release N2 during rich operation. Upstream of the TWC, a linear A/F (LAF) sensor 14 is provided, which outputs an electric signal almost proportional to an air/fuel ratio. Between TWC and LNC, there is provided an O2 sensor 16, which outputs an electric signal for changing the level like on/off between the lean and rich sides relative to a theoretical air/fuel ratio. Signals from these sensors are supplied to the ECU 20.

The electronic control unit ECU 20 is implemented in a computer, which comprises read-only memory (ROM) for storing programs to be executed on CPU and data to be used with the programs, random access memory (RAM) for providing work areas for computing operations, a central processing unit (CPU) for executing the programs, electronic circuits including a processing circuit for processing input signals from various sensors and a driving circuit for sending control signals to each engine element. FIG. 1 illustrates the ECU 20 with functional blocks based on such hardware configuration.

General Functionality of the Electronic Control Unit

An occluded NOx estimate block 23 receives the intake pipe pressure PB from the sensor 7 and the engine revolution NE from the sensors 11 and then estimates the amount of the NOx occluded by the lean NOx catalyst 15 based on the received PB and NE.

During the lean-burn operation, an adding block 25 assumes a possible NOx amount that should be occluded during the rich reduction process. The adding block 25 then adds such assumed amount to the occluded NOx amount that has been previously estimated by the occluded NOx estimate block 23 to obtain a sum value. The obtained sum value is compared with a predetermined saturation value by a determination block 26. If the determination block 26 determines that the sum value of the occluded NOx amount exceeds the predetermined value, it will set a rich reduction permission flag F-RSPOK to 1. In response to this set, a target air/fuel ratio setting block 21 set an air/fuel ratio to a rich reduction target air/fuel ratio KBSRSP. In one embodiment, the rich reduction target air/fuel ratio is 13.0 for example. The reason the adding block 25 adds the NOx amount that should be occluded during the rich reduction process is as follows: Even during the rich reduction process, some amount of NOx may be occluded by the lean NOx catalyst 15. So, by determining the transition to the rich reduction based on the sum of such probable amount to the estimated amount of the occluded NOx, it is possible to prevent the NOx generated during the rich reduction process from being released into the air without being occluded by the lean NOx catalyst 15.

An operation state determination block 24 determines the operation state of the concerned automobile based on such parameters as the engine revolution, the air intake pipe pressure, and accelerator opening degree. The operation state determination block 24 then determine a transition between a lean-burn operation mode and a stoichiometric operation mode and send an corresponding signal to the target air/fuel ratio setting block 21.

When the target air/fuel ratio setting block 21 receives, from the operation determination block 24, the signal indicating the transition from the lean-burn operation to the stoichiometric operation (hereinafter referred to as "transition from lean to stoichiometry"), it performs a process for setting the air/fuel ratio from a theoretical value to a rich value so that the NOx occluded in the lean NOx catalyst 15 during the lean-burn operation could be reduced and accordingly the lean NOx catalyst 15 could recover its functionality. This process is called "a rich process on the transition to stoichiometry". In one embodiment, the target air/fuel ratio setting block 21 may set the target air/fuel ratio KBS1 for rich process on the transition from lean to stoichiometry to 13.0 for example. In this case, the adding block 25 adds the amount of NOx that is assumed to be occluded during the rich process on the transition to stoichiometry to the occluded NOx amount that has been estimated by the occluded NOx estimate block 23. This resulting value will be used as a threshold by a threshold value setting block 29 to determine a completion of the rich process.

An intake air amount correlation value accumulation block 27 starts to accumulate the intake air amount correlation value NTI when it receives a reverse signal from the O2 sensor 16 (indicating that the air/fuel ratio of the exhaust gas flowing into the lean NOx catalyst 15 changes from the lean side to the rich side). Since the amount of the intake air has a correlation with the amount of the reducing gases (HC and CO), the accumulated amount of the intake air accumulated since the air/fuel ratio of the exhaust gas changes from the lean side to the rich side has a correlation with the progress of reducing the NOx occluded by the lean NOx catalyst 15. When the accumulated intake air amount correlation value accumulated by the accumulation block 27 reaches the threshold value set by the threshold value setting block 29, a reduction completion decision block 31 decides to complete the reduction process and send a corresponding signal to the target air/fuel ratio setting block 21.

The threshold value setting block 29 sets a fixed value as a threshold value during the rich reduction process in the lean-burn operation. During the rich process on the transition from lean to stoichiometry, the threshold value setting block 29 obtains a corresponding threshold value by searching a table based on the sum value that is obtained by adding the amount of NOx that is assumed to be occluded during the rich process on the transition to the stoichiometry to the occluded NOx amount that has been estimated in the occluded NOx estimate block 23.

A fuel injection control block 22 calculates a fuel injection pulse width Tout by a following equation using the established target air/fuel ratio, and drives the fuel injection unit 6:

$$Tout = TIM * Kcyl + TiVb \qquad (1)$$

where TIM represents a basic fuel injection width, Kcyl represents a fuel correction term and TiVb represents an invalid fuel injection width. Appropriate values are preselected for TIM and TiVb. The fuel correction term is calculated by a following equation:

$$Kcyl = KCMD * KAF \qquad (2)$$

where KCMD represents a feed-forward (F/F) correction term, which is to be determined with the basic target air/fuel ratio KBS and the rich reduction target air/fuel ratio KBSRSP depending on the operational conditions. KAF is a feedback (F/B) correction term. ECU 20 executes the air/fuel ratio feedback with KCMD as its target.

Figure 2:
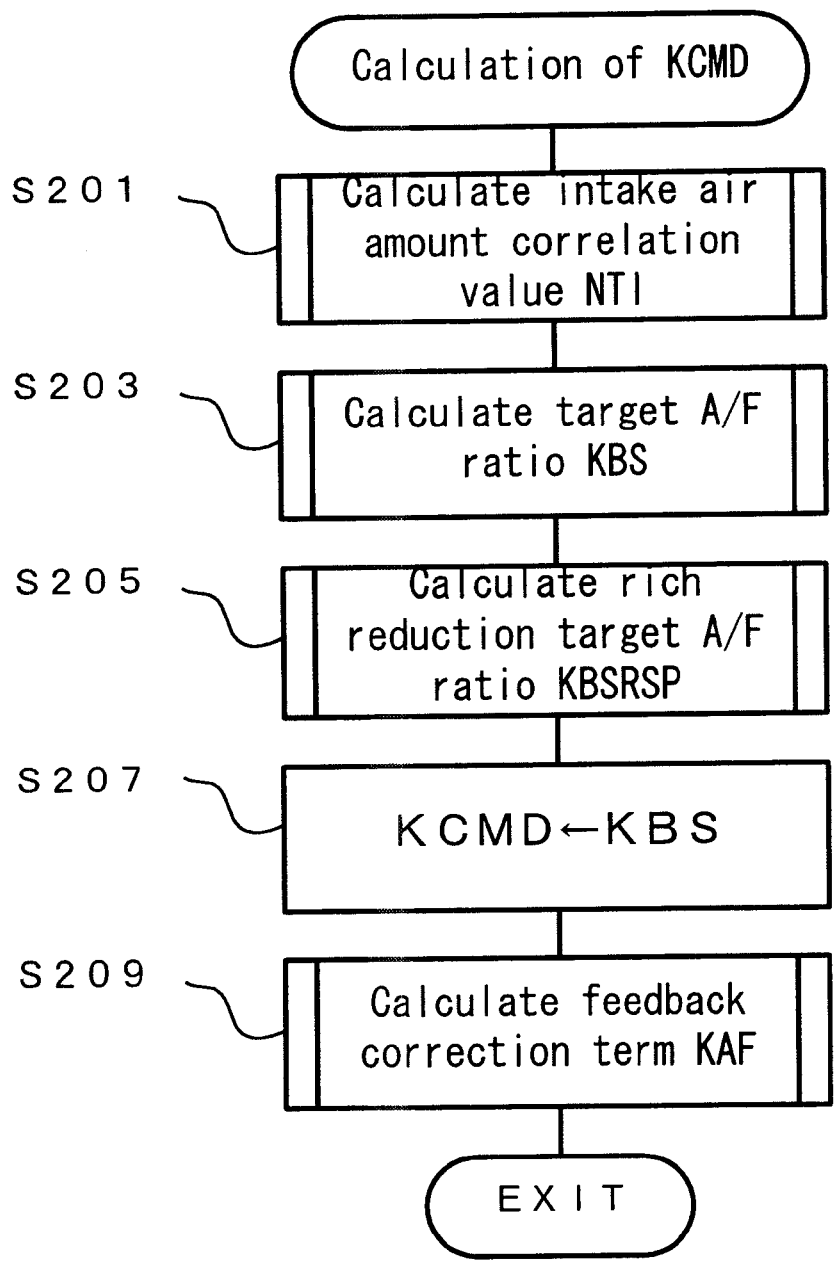
FIG. 2 is a flow chat for calculating a feedback target of an air/fuel ratio.

FIG. 2 is a flow chart illustrating a process for calculating the F/F correction term KCMD, which is executed with each TDC pulse. First the intake air amount correlation value is calculated by means of another process that will be described later with reference to FIG. 3 (S201), and then the basic target air/fuel ratio KBS is calculated by means of a basic target air/fuel ratio calculation process depending on the operational conditions, which will be also described later in conjunction with FIG. 6 (S203). The rich reduction target air/fuel ratio KBSRSP is calculated by means of a rich reduction coefficient calculation process that will be explained later with reference to FIG. 5 (S205). KBS is set to KCMD (S207) and the F/B correction term KAF is calculated by means of the feedback control computing (S209). Thus, the injection correction term Kcyl based on the air/fuel ratio is calculated, which is required for calculating the fuel injection pulse width Tout.

Back to FIG. 1, an ignition timing control block 41 controls the ignition timing for the ignition plug 5 in accordance with the following equation:

$$IGLOG=IGMAP+IGCR \quad (3)$$

where IGLOG represents a final ignition timing, IGMAP represents a basic ignition timing and IGCR represents an ignition timing correction term. IGMAP is retrieved from a map with the engine revolution NE and the intake pipe pressure PB as its parameters. IGCR is calculated by the following equation:

$$IGOR=IGTW-IGRSP+(\text{other correction terms}) \quad (4)$$

where IGTW represents a correction term based on the engine water temperature and IGRSP represents a retard amount during the rich reduction process. The retard amount during the rich reduction process is controlled by a retard amount calculation block 43, a gradual retard decreasing block 45, a retard holding block 47 and a retard decrementing block 49.

The retard amount calculation block 43 calculates a retard amount IGRSP (see FIG. 8) when the rich reduction permission flag F-RSPOK is set to 1 by the determination block 26. In response to receiving the retard amount IGRSP from the retard amount calculation block 43 when the rich reduction permission flag F-RSPOK is set to 1, and, the ignition timing control block 41 starts to lag the ignition timing after a predetermined delay period CIGRSP has elapsed after the rich retard permission flag F-RSPOK was set to 1. The retard amount (lagging amount) is calculated by multiplying a value obtained through the table search based on the engine load (as will be explained in detail later with reference to FIG. 6) by a coefficient based on the target air/fuel ratio. The delay period CIGRSP corresponds to a mechanical delay from the time the fuel injection control block 22 starts the electric control for the rich reduction process to the time the rich mixture gas is actually supplied to the engine. This delay period is set equal to 8 TDC pulse in one embodiment.

The gradual retard decreasing block 45 gradually decreases the retard amount after a predetermined period, for example one second, has elapsed after the start of the lagging. This gradual decreasing is performed for the purpose of improving the emission and the fuel efficiency without the deterioration of the drivability as described above. The retard holding block 47 calculates a lower limit value IGRSJ for the gradual retard decreasing, based on the table search depending on load states. When the retard amount reaches the lower limit IGRSJ, the retard holding block 47 stops the gradual decreasing process and holds the retard amount to the lower limit IGRSJ.

When the rich exhaust gas is supplied to the lean NOx catalyst 15 through the rich reduction air/fuel control and resultingly the outputs of the O2 sensor reverses, the intake air amount correlation value accumulation block 27 start to accumulate the intake air amount correlation value that is correlated with the exhaust gas amount. When the accumulated value reaches the threshold value that has been set by the threshold setting block 29, the decision block 31 sets the rich reduction permission flag F-RSPOK to 0 (zero). In response to this, the retard decrementing block 49 gradually decrements the retard amount from the hold value to zero. Thus, the ignition timing is returned to the normal timing.

Accumulation of Exhaust Gas Flow Amount

Figure 3:
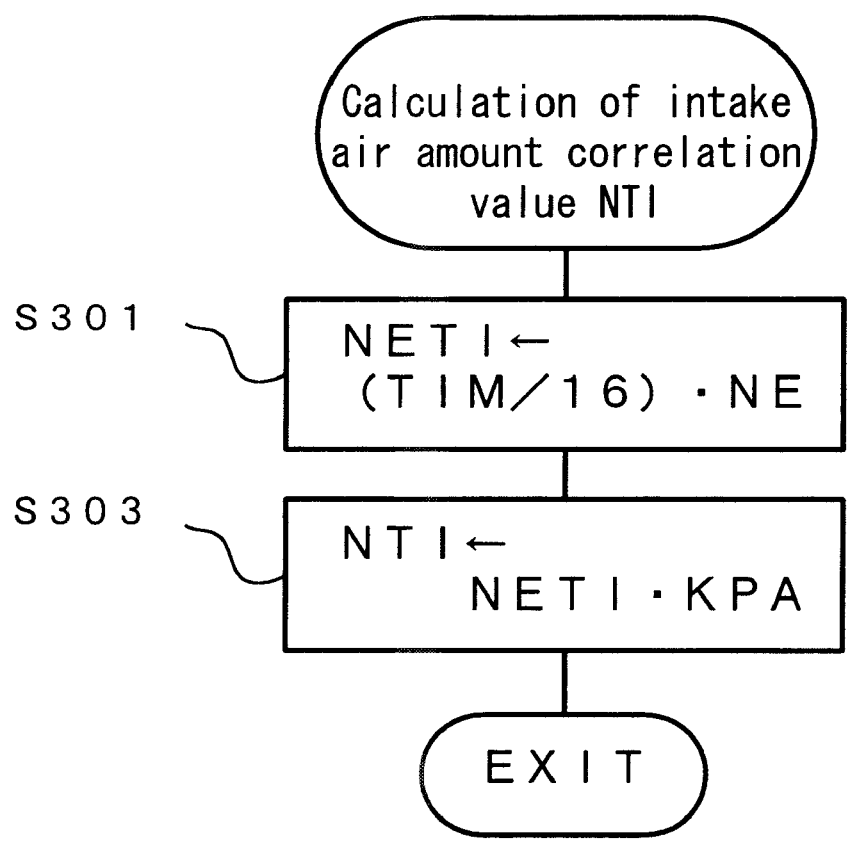
FIG. 3 is a flow chart for calculating an intake air amount correlation value.

In this embodiment of the invention, the accumulated value of the intake air amount correlation value is used as a substitute for an accumulated value of the exhaust gas flow amount, which is calculated by the intake air amount correlation value accumulation block 27 in FIG. 1. FIG. 3 is a flow chart illustrating a process for calculating the intake air amount correlation value NTI, which is performed in step S201 of FIG. 2. At step S301 of FIG. 3, NETI is calculated by multiplying 1/16 of the basic fuel injection width TIM by the engine revolution NE. Then NTI is calculated by multiplying NETI by an air pressure correction term KPA that is to be determined based on an air pressure detected by an air pressure sensor (S303). Instead of calculating the intake air amount, the actually measured amount may be alternatively used as the intake air amount.

Figure 4:
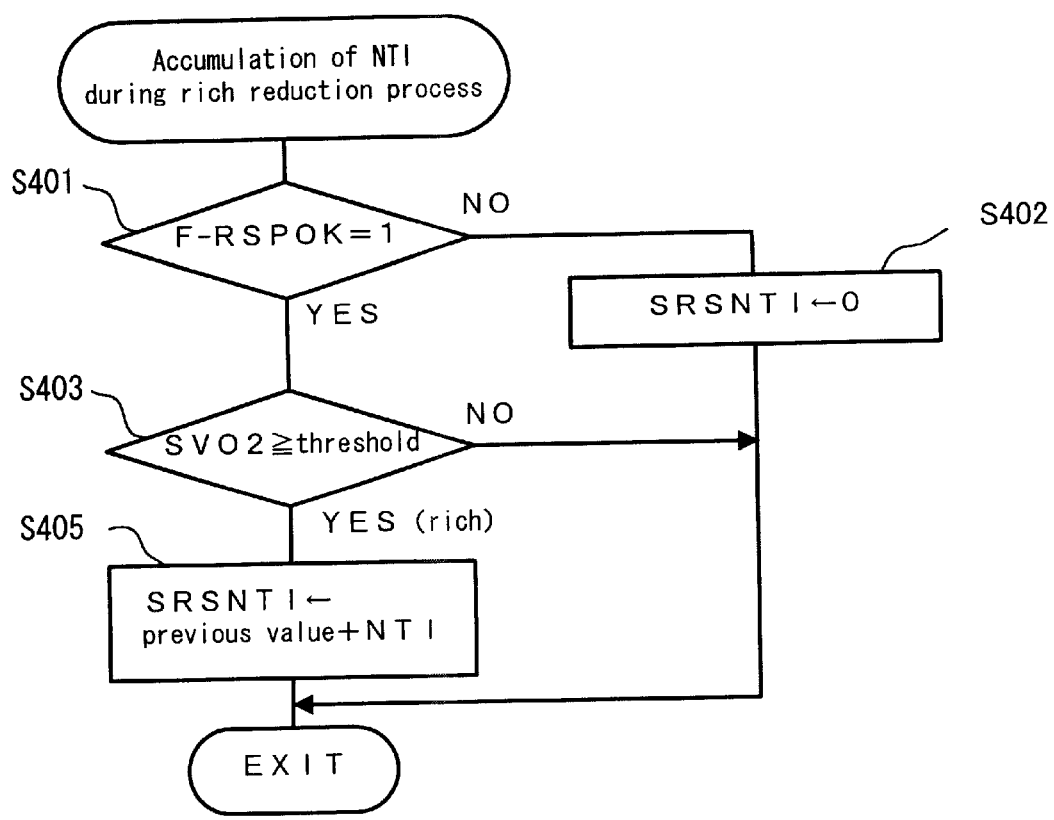
FIG. 4 is a flow chart for calculating an accumulated value of an intake air amount increasing after the transition from lean to stoichiometry.

FIG. 4 is a flow chart illustrating a process for calculating an accumulated value SRSNTI of the NTI when the rich reduction process is performed during the lean-burn operation. First, the process determines whether the rich reduction permission flag F-RSPOK is set to 1 or not (S401). If not, the process sets the accumulated value SRSNTI to zero (S402). If the flag is set to 1, the process determines whether the output SVO2 of the O2 sensor 16 exceeds a predetermined threshold value or not, namely whether the air/fuel ratio has been reversed from the lean side to the rich side (S403). If the air/fuel ratio has not been reversed, the process ends. If the air/fuel ratio has been reversed, NTI calculated through the process of FIG. 3 is added to the previous accumulated value to produce the current accumulated value SRSNTI (S405). This current accumulated value will be used to determine the completion of the rich reduction process in step S519 of FIG. 5.

Figure 5:
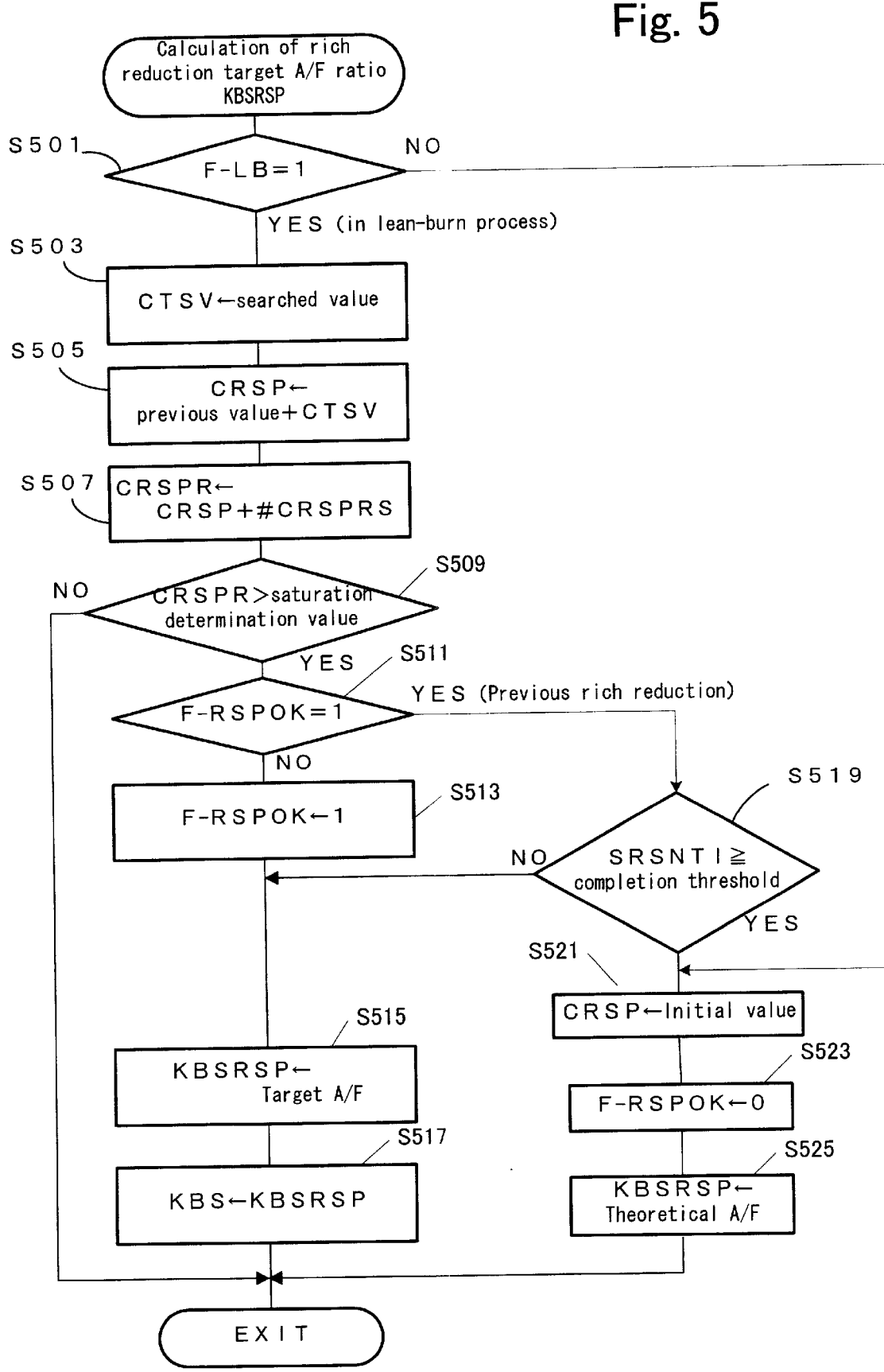
FIG. 5 is a flow chart for calculating a target air/fuel ratio during rich reduction process.

Calculation of the Target A/F Ratio KBSRSP for the Rich Reduction Process During the Lean-Burn Operation With reference to FIG. 5, the rich reduction process for the air/fuel ratio during the lean-burn operation (step S205 of FIG. 2) will be described. This rich reduction process is performed for the purpose of temporarily changing the air/fuel ratio to the rich side during the lean-burn operation to reduce the NOx occluded by the lean NOx catalyst and to recover the cleaning functionality of the catalyst.

The process determines whether the lean-burn control is permitted or not by checking the lean-burn permission flag F-LB (S501). If the flag is set to 1, which means that the lean-burn control is permitted, the process searches an occluded NOx estimate value (CTSV) map using, as searching parameters, the engine revolution NE and the intake pipe pressure PB which are detected by each sensor in order to obtain an occluded NOx estimate value CTSV (S503). The process adds the occluded NOx estimate value obtained in step S503 to the previously estimated value of the occluded NOx to produce the current value CRSP (S505). Then, the process adds the NOx amount CRSPRS, which is assumed to be occluded by the lean NOx catalyst during the lean-burn operation, to the current CRSP to obtain the estimated value CRSPR for the occluded NOx (S507).

The process determines whether the estimated value CRSPR for the occluded NOx exceeds a predetermined saturation determination value or not (S509). If the estimated value CRSPR does not exceed the predetermined saturation determination value, the process ends because no rich reduction process is required, and will restart the accumulation process for the estimated value of the occluded NOx in step S501 in the subsequent processing cycle. If the estimated value CRSPR exceeds the predetermined saturation determination value, the rich reduction process is performed in step S511 and subsequent steps.

The process determines whether the rich reduction permission flag F-RSPOK is set to 1 or not (S511). If the flag is set to 0, the process sets the flag F-RSPOK to 1 (S513) and sets the air/fuel ratio KBSRSP for the rich reduction process to the rich reduction target air/fuel ratio (13.0 for example) (S515). Then the process sets to KBSRSP the basic target air/fuel ratio KBS depending on the operational conditions (S517).

Figure 6:
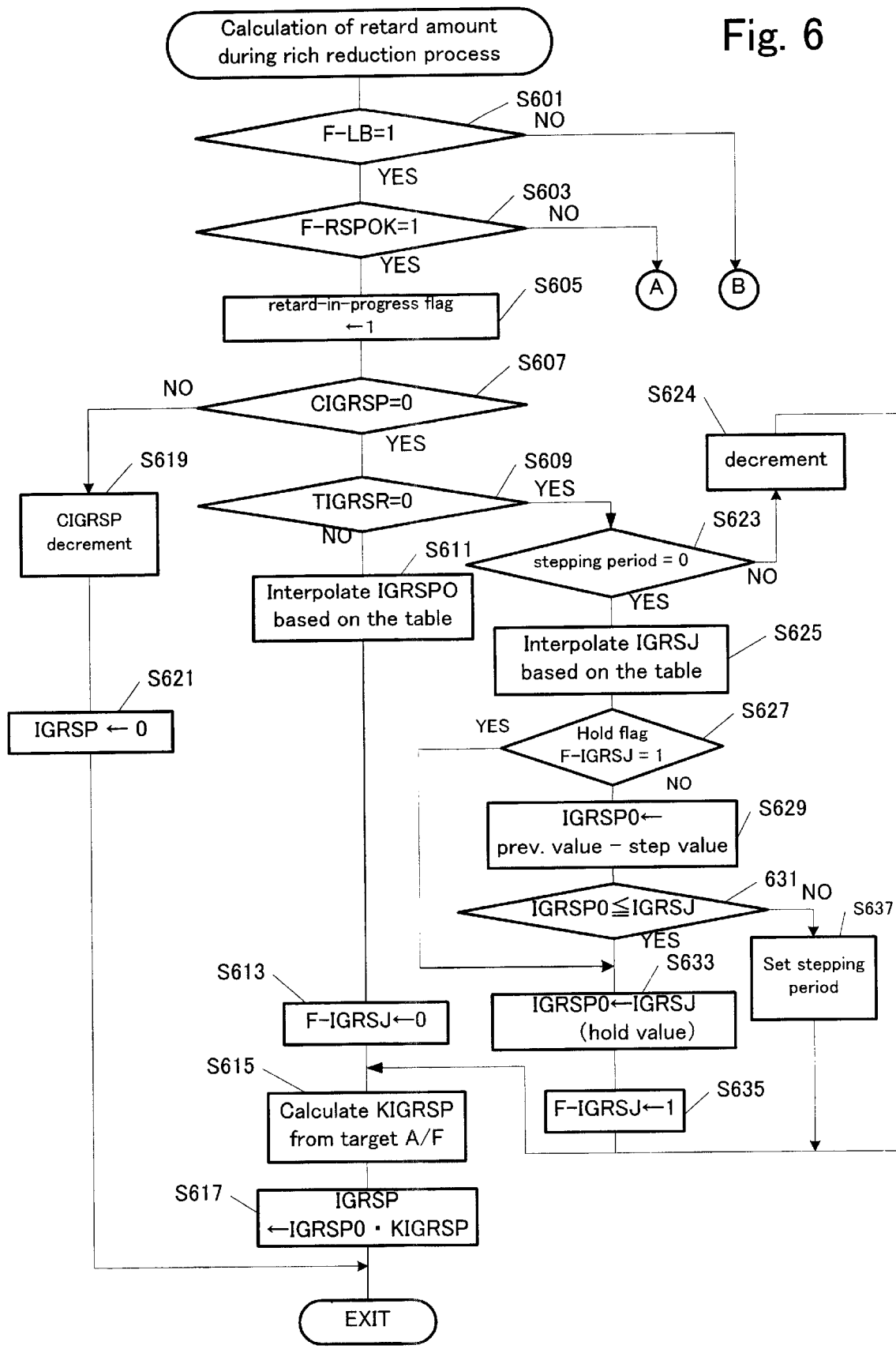
FIG. 6 is a flow chart for calculating a retard amount during the rich reduction process.
Figure 7:
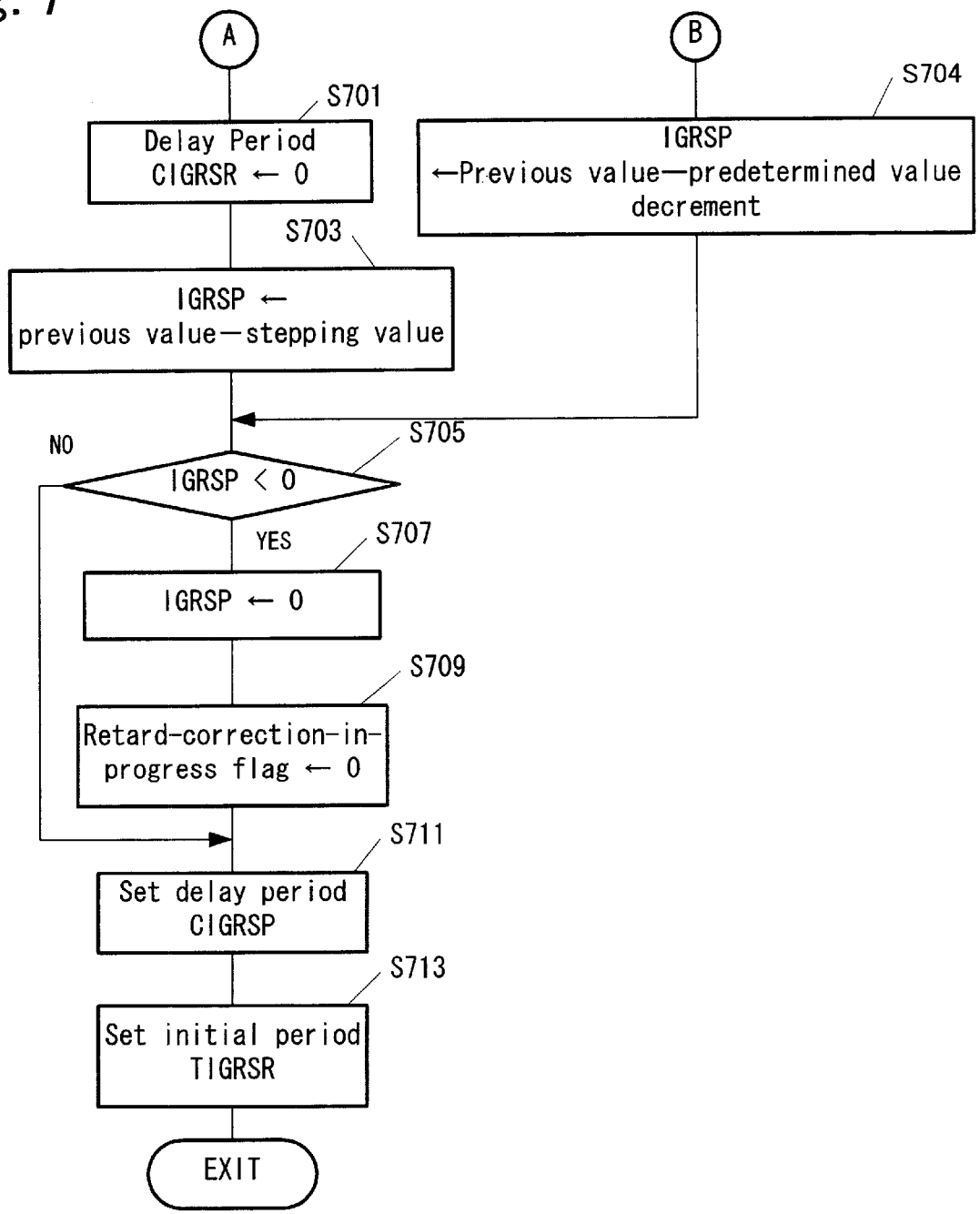
FIG. 7 is a flow chart for calculating a retard amount during the rich reduction process.

With reference to FIG. 6 through FIG. 9, the retard control for the ignition timing during the rich reduction process (RSP) will be described. The process illustrated in FIG. 6 and FIG. 7 is performed with each TDC pulse. If the lean-burn permission flag F-LB is set to 1 (S601) and the rich reduction permission flag F-RSPOK is also set to 1 (S605), then the process will set a retard-in-progress flag to 1 (S605) and proceeds to the retard control steps starting from step S607.

Figure 9A:
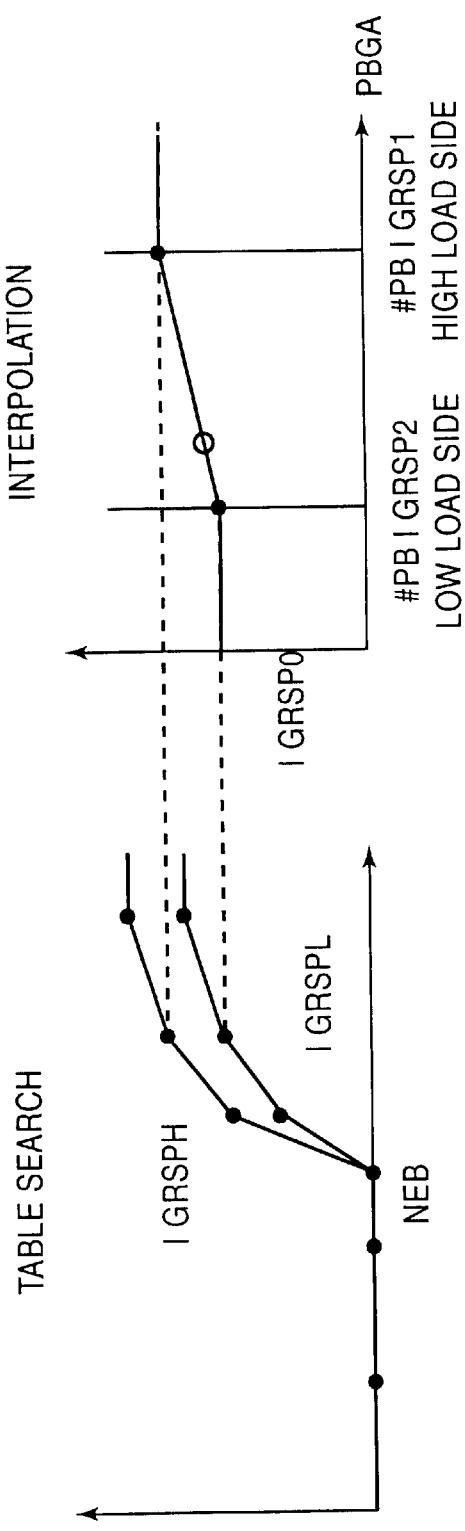
FIG. 9(A) is a block diagram illustrating a table and its interpolation for calculating a basic retard amount IGRSP0 during the rich reduction process.
Figure 9B:
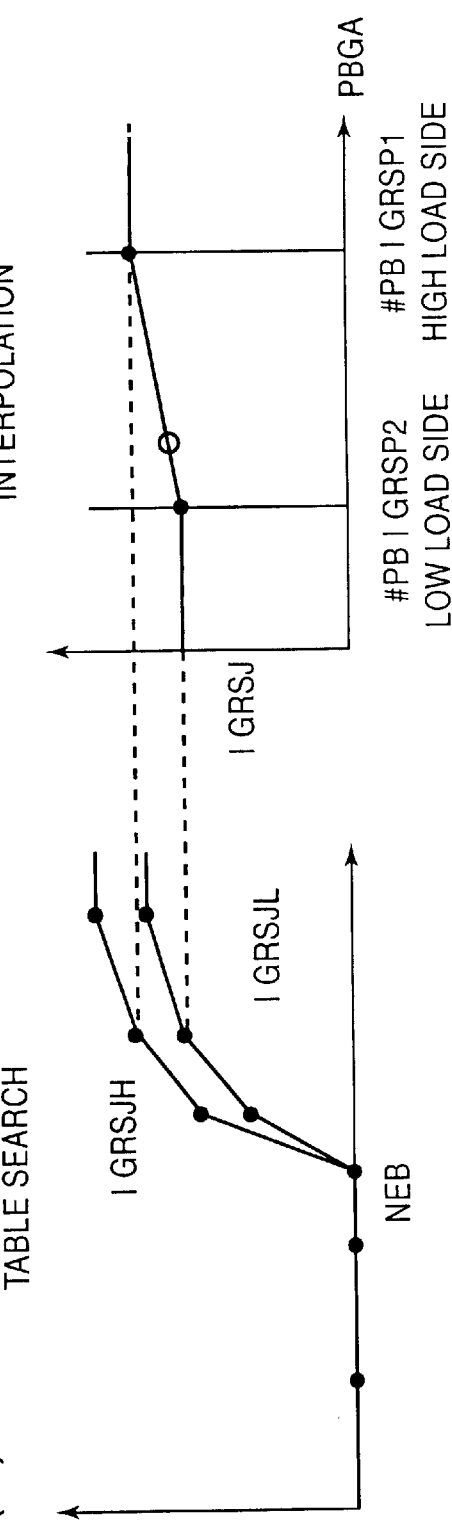
FIG. 9(B) is a block diagram illustrating a table and its interpolation for calculating a hold value IGRSI of the retard amount during the rich reduction process.
Figure 10:
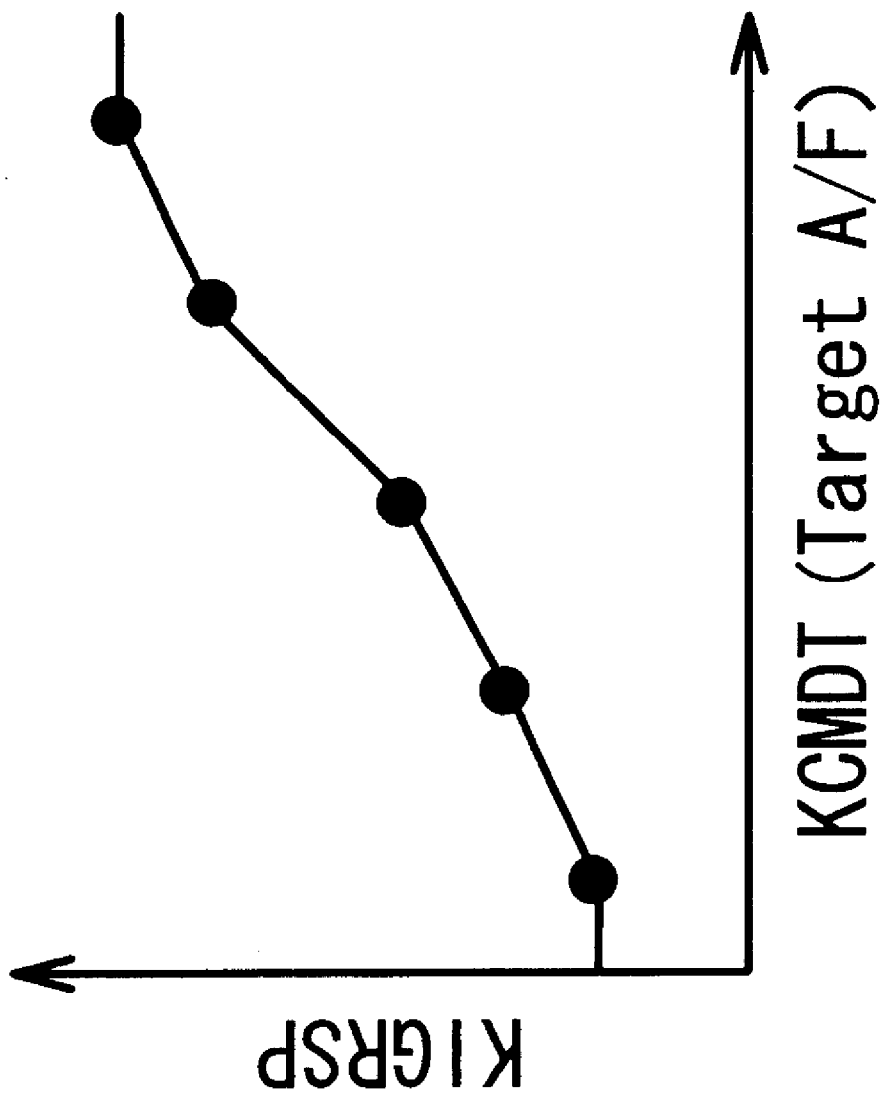
FIG. 10 is a block diagram illustrating a table for obtaining a coefficient KIGRSP from the target air/fuel ratio.

If the delay period CIRGSP shown in FIG. 8, 8 TDC pulse for example, has elapsed (S607) but the initial period TIGRSR (one second for example) has not elapsed yet (S609), the process obtains respective retard values IGRSPH and IGRSPL from a high load table and a low load table, shown in FIG. 9(A), using the engine revolution as a parameter and interpolates those values with the intake pipe pressure to obtain the basic retard value IGRSP0 (S611) (see FIG. 9(A)). Then the process sets a hold flag F-IGRSJ to zero (S613) and obtains a retard coefficient KIGRSP corresponding to the target air/fuel ratio KCMDT from the table shown in FIG. 10 (S615). The process multiplies the basic retard value IGRSP0 obtained in step S611 by the retard coefficient KIGRSP obtained in step S615 to process the retard amount IGRSP (S617).

If the delay period CIRGSP has not elapsed in step S607, the process proceeds to step S619 to decrement the delay period and set the retard amount IGRSP to zero in step S621.

If the initial period TIGRSR has elapsed in step S609, the process determines whether a stepping period for gradually decreasing the retard amount, namely, the period of one step where the retard amount gradually decreases in a stepping manner as illustrated in FIG. 8 after the period TIGRSR has elapsed, is zero or not (S623). If it is zero, the process obtains retard hold values IGRSJH and IGRSJL respectively from a high load table and a low load table, shown in FIG. 9(B), using the engine revolution as a parameter and interpolates those values with the intake pipe pressure PBGA to obtain the retard hold value IGRSJ (S625) (see FIG. 9(B)).

Then, the process proceeds to step S627 to determine whether the hold flag F-IGRSJ is set to 1 or not. If it is not set to 1, the process subtracts a stepping period for the gradual decrease (DIGRSR in FIG. 8) from the previous value of the basic retard amount IGRSP0 to obtain the current retard amount (S629). If the current value of the basic retard amount is less than or equal to the hold value (IGRSJ in FIG. 8) in step S631, the process sets the basic retard amount IGRSP0 to the hold value IGRSJ (S633), sets the hold flag F-IGRSJ to 1 (S635), and proceeds to step S615.

If the hold flag F-IGRSJ is set to 1 in step S627, the process proceeds to step S633. If the basic retard amount IGRSP0 exceeds the hold value IGRSJ in step S631, the process sets the aforementioned stepping period for the gradual decrease on a timer or counter (S637) and proceeds to step S615. If the stepping period for the gradual decrease is not zero in step S623, the process decrements the stepping period (S624) and proceeds to step S615.

If the lean-burn permission flag F-LB is not set to 1 in step S601, which means that the lean-burn operation during the rich reduction process is prohibited, the process proceeds to step S704 of FIG. 7 to gradually decrease the retard amount IGRSP. If the rich reduction permission flag F-RSPOK is not set to 1 in step S603, the process proceeds to step S701 of FIG. 7 to set the delay period CIGRSR to zero. Then, the process subtracts the stepping value for the gradual decrease from the previous value of the retard amount IGRSP to obtain the current value (703). If the current value is less than zero (S705), the process sets the retard amount to zero (S707) and set the retard-in-progress flag to zero (S709). Then the process sets the delay period CIGRSP timer or counter to a predetermined value (8 TDC pulse for example) (S711), set the initial period TIGRSR to a predetermined value (one second for example) (S713), and ends. Thus, the process ends after it sets the parameters for gradually decreasing the retard to the respective initial values either when the rich reduction process is prohibited or when the lean-burn condition is lost.

Although the linear air/fuel ratio sensor is used as the air/fuel ratio sensor upstream of the three-way catalyst in the above-mentioned embodiment, an O2 sensor may be used alternatively. It should be noted that although the invention has been described in conjunction with the specific embodiment, the invention is not intended to be limited to such specific embodiment.

What is claimed is:

1. An electronic control unit for controlling an air/fuel ratio of an engine having a lean NOx catalyst in its exhaust system, comprising:

air/fuel ratio control means for changing the air/fuel ratio to a rich side when an amount of NOx occluded by the lean NOx catalyst exceeds a predetermined value and changing said air/fuel ratio back to a lean side when a first predetermined period has elapsed;

lagging means for lagging ignition timing in synchronization with the air/fuel ratio changing to the rich side by said air/fuel ratio control means; and decrementing means for decrementing amount of the ignition timing lagged by said lagging means by a predetermined amount when a second predetermined period shorter than said first predetermined period has elapsed after the air/fuel ratio changing to the rich side;

wherein said decrementing means gradually decrements said lagged amount up to a hold value.

2. A method for controlling an air/fuel ratio of an engine having a lean NOx catalyst in its exhaust system, comprising:

changing the air/fuel ratio to a rich side when an amount of the NOx occluded by the lean NOx catalyst exceeds a predetermined value;

changing said air/fuel ratio back to a lean side when a first predetermined period has elapsed;

lagging ignition timing in synchronization with the air/fuel ratio changing to the rich side; and decrementing amount of the ignition timing lagged by said lagging step by a predetermined amount when a second predetermined period shorter than said first predetermined period has elapsed after the air/fuel ratio changing to the rich side, wherein said decrementing step gradually decrements said lagged amount up to a hold value.

* * * * *